United States Patent [19]

Tripp

[11] 3,789,393

[45] Jan. 29, 1974

[54] DIGITAL/ANALOG CONVERTER WITH AMPLITUDE AND PULSE-WIDTH MODULATION

[75] Inventor: Robert W. Tripp, Tuckahoe, N.Y.

[73] Assignee: Inductosyn Corporation, Valhalla, N.Y.

[22] Filed: Oct. 26, 1972

[21] Appl. No.: 301,030

[52] U.S. Cl. .......... 340/347 DA, 318/599, 321/9 A, 235/186, 332/9 R

[51] Int. Cl. .......... H03k 13/02

[58] Field of Search .......... 318/599, 341; 321/9 A; 307/265; 235/186; 340/347 DA; 332/9

[56] References Cited

UNITED STATES PATENTS

| | | | |
|---|---|---|---|
| 3,446,992 | 5/1969 | Webb | 318/599 |
| 3,668,560 | 6/1972 | Padalino et al. | 307/265 |
| 3,324,376 | 6/1967 | Hunt | 318/599 X |
| 3,706,943 | 12/1972 | Duncan et al. | 307/265 |
| 3,596,200 | 7/1971 | Fausey, Jr. et al. | 307/265 |
| 3,621,354 | 11/1971 | Fawcett | 318/341 |

*Primary Examiner*—Charles D. Miller
*Attorney, Agent, or Firm*—William E. Beatty; Leonard Weiss

[57] ABSTRACT

Disclosed is a digital-to-analog position-measuring apparatus in which the position-measuring transducer is energized by a combination of differently modulated signals. In one preferred embodiment of the present invention, trigonometrically related (sine-cosine) pulse-width modulated signals are trigonometrically summed with pulse-amplitude modulated signals. The pulse-amplitude modulated signals comprise the fine bits and the pulse-width modulated signals comprise the coarse bits of the apparatus of the preferred embodiment of the present invention.

10 Claims, 16 Drawing Figures

DIGITAL/ANALOG CONVERTER WITH AMPLITUDE AND PULSE-WIDTH MODULATION

CROSS REFERENCE TO RELATED APPLICATIONS

1. TRIGONOMETRIC SIGNAL GENERATOR AND MACHINE CONTROL, U. S. Pat. No. 3,686,487; issued Aug. 22, 1972; invented by Robert W. Tripp; assigned to Inductosyn Corp.

2. SCALE OF 2 IMPROVED DIGITAL AND ANALOG CONVERTER, U. S. Ser. No. 112,994; filed Feb. 5, 1971; invented by Robert W. Tripp; assigned to Inductosyn Corp.

3. TRANSDUCER DRIVE APPARATUS AND METHOD, U. S. Ser. No. 225,729; filed Dec. 27, 1971; invented by Robert W. Tripp; assigned to Inductosyn Corp.

BACKGROUND OF THE INVENTION

The present invention relates to the field of digital and analog converters typically used with position-measuring transducers and, particularly, to converters employed for accepting digital inputs and responsively providing transducer drive signals having a combination of modulations, for example, pulse-width and pulse-amplitude modulations.

One converter for use with position-measuring devices is described in the above-referenced application Ser. No. 112,994. In that application, a digital and analog converter is disclosed which accumulates a digital value n, stored as a running count difference between the counts in two cyclically stepped counters, and responsively forms pulse-width modulated output signals. The output signals drive, that is, energize, a position-measuring device. Suitable position-measuring devices are frequently marketed under the registered trademark Inductosyn. Such devices are typically transformers having trigonometrically related windings, such as sine and cosine, on one member and a continuous winding on the other member.

Position-measuring transformers typically operate over one or more discrete space cycles, for example, 0.1 inch or 1 mm. for linear devices or 1 degree for rotary devices. To obtain further resolution, each space cycle is divided into a number, N, of parts, where N typically is 2,000, 10,000, 2,048, or some similar number. The digital value n identifies a particular one of the space positions between O and N over one space cycle. The value of n is stored in a converter, as discussed above. The pulse-width modulated output signals from the converter are applied through a drive circuit to the transformers windings and have pulse widths which are a function of the ratio n/N.

In the above-referenced application Ser. No. 225,729, an improved transducer drive apparatus and method is disclosed which employs bistate switching devices to bilaterally drive the position-measuring transducer windings. In that application, both 2 level and 3 level pulse-width modulated signals are employed.

While the above-mentioned systems have proved satisfactory, it is still desired to increase the carrier frequency at which those systems operate to increase the number of divisions, N, by which the transducer cycle is divided or to otherwise increase the performance and accuracy of those systems.

In accordance with the above background of the invention, it is an object of the present invention to provide a system capable of a higher operating carrier frequency or alternatively a higher number of divisions of the transducer cycle at the same operating frequency.

SUMMARY OF THE INVENTION

An object of the present invention is to provide a digital-to-analog converter which may be included in a position-measuring apparatus having a large number of divisions of a cycle of a transducer and a high carrier frequency.

According to the present invention, a first pulse train is generated wherein each pulse has a duration which is a first function of a coarse portion of an electrical angle; a second pulse train is generated wherein each pulse has an amplitude which is a function of a fine portion of said electrical angle and a duration which is a second function of said coarse portion; a summation of the amplitudes of pulses of said first and second trains provides an output pulse train which includes a carrier frequency component having an amplitude and a phase which are representative of a trigonometric function of said angle.

According to a specific embodiment of the present invention, a first output pulse train includes a carrier frequency component having an amplitude proportional to the sine of said angle and having a phase representative of the sign of the sine of said angle; said first output pulse train is provided in response to a summation of a sine pulse train and a cosine product pulse train which are respectively comprised of pulses provided at said carrier frequency; said sine pulses have a duration which is a function of said coarse component whereby a carrier frequency component of said sine pulse train has an amplitude proportional to the sine of said coarse portion and has a phase representative of the sign of the sine of said coarse portion; said cosine product pulses have an amplitude proportional to said fine portion and a duration which is a function of said coarse portion whereby a carrier frequency component of said cosine product pulse train has an amplitude proportional to a cosine product which is the product of said fine portion and the cosine of said coarse portion and has a phase representative of the sign of said cosine product.

In further accord with said embodiment, a second output pulse train includes a carrier frequency component having an amplitude proportional to the cosine of said angle and having a phase representative of the sign of the cosine of said angle; said second output pulse train is provided in response to a subtraction of a sine product pulse train from a cosine pulse train which are respectively comprised of pulses provided at said carrier frequency; said cosine pulses have a duration which is a function of said coarse component whereby a carrier frequency component of said cosine pulse train has an amplitude proportional to the cosine of said coarse portion and has a phase representative of the sign of the cosine of said coarse portion; said sine product pulses have an amplitude proportional to said fine portion and a duration which is a function of said coarse portion whereby a carrier frequency component of said sine product pulse train has an amplitude proportional to a sine product which is the product of said fine portion and the sine of said coarse portion and has a phase representative of the sign of said sine product.

Figure 1:
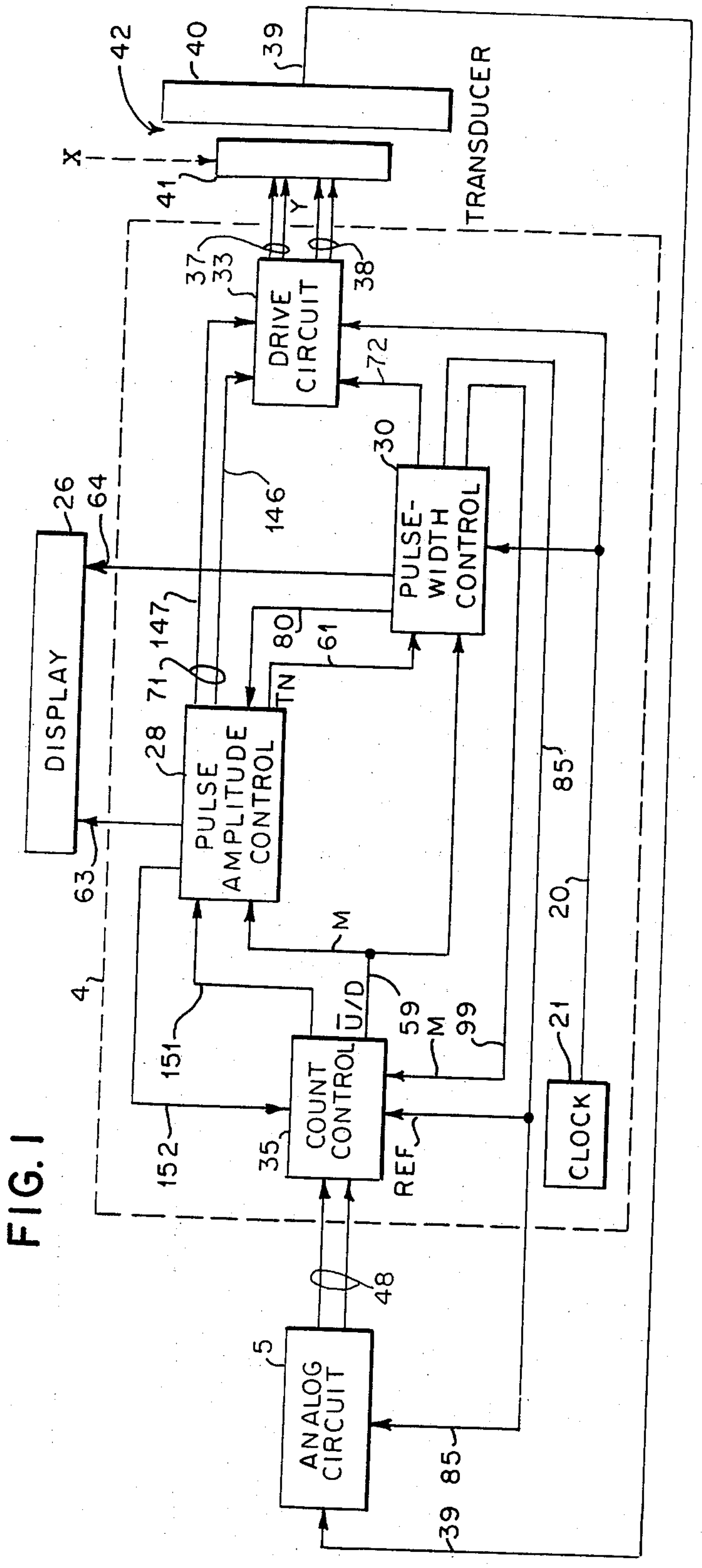
FIG. 1 depicts a general block diagram of a position-measuring apparatus in accordance with the present invention.

In the drawings where a plurality of lines are represented by a single line, the number of lines is indicated within a circle in that line.

DETAILED DESCRIPTION

Overall System

Referring to FIG. 1, a position-measuring transducer 42 is typically like that marketed under the registered trademark INDUCTOSYN. The transducer 42 includes a single phase member 40 which is usually stationary and polyphase member 41 which is movable relative to the member 40 as indicated by the positional input X. The member 41 may be moved manually or under automatic control, which typically occurs, for example, when position measurements are carried out on machine tools.

In addition to the positional input X, member 41 has electrical inputs on lines 37 and 38 which define the electrical position, Y. The output from the member 40 of transducer 42 on lines 39 includes a component which has an amplitude which is a function of the difference between the space position, X, and the electrical position, Y. The system of FIG. 1 is operated as a servo mechanism so that the electrical angle Y is continually adjusted to reduce the error signal on lines 39 to a null whereby the electrical position Y is a measure of the space position X. The display device 26 gives a visual readout of the space position, X, of the transducer 42. The operation of transducers in a servo mechanism for position measurement is well known. For further information, reference can be made to the above-identified cross-referenced related patent and applications.

The present invention is directed to the manner in which the electrical signals on lines 37 and 38 are generated. Whenever an error signal occurs on lines 39, indicating a discrepancy between the space position, X, and the electrical position, Y, the error signal on lines 39 is detected in analog circuit 5 by suitable and well known filtering or phase detection to produce dc error signals on lines 48 proportional to that discrepancy. The dc error signals on lines 48 represent the positive, $+e$, and the negative, $-e$, values of the same function $e$ thereby defining a switching zone between $+e$ and $-e$ employed in the count control further described hereinafter in connection with FIG. 2. The dc error signals on lines 48 serve as the input to the digital-sine-cosine generator (DSCG) 4.

The generator 4 is responsive to the error signal on lines 48 to modify the drive signals on lines 37 and 38 until the electrical position, Y, equals the space position, X, thereby reducing the error signal on lines 39 to a null.

The generator 4 operates by means of a count control 35 to generate output pulses on line 58 as long as the error signal on lines 39 exceeds a threshold defined by the $+e$ and $-e$ signals. The positive or negative sense of the pulses on line 58 is determined by the positive or negative level of line 59 which is itself determined by the positive or negative sense of the +e signal. Each pulse (or each group of pulses) on line 58 represents one unit of position for transducer member 41. The pulses on line 58 are algebraically accumulated in the pulse-amplitude control 28 as hereinafter described, until a certain number, A, has been accumulated (for example, A equal to 5). Each of those pulses represents the fine bits of position measurement. After A fine bits have been accumulated, the fine bit count is reset to zero producing an output on line 61 which serves as one coarse bit input to the pulse-width control 30. The number of coarse bits into the pulse-width control 30 is similarly algebraically accumulated. The total accumulated counts in pulse-amplitude control 28 (fine bits) and in pulse-width control 30 (coarse bits) are transmitted over lines 63 and 64, respectively, to a display 26 which displays those accumulated counts as a measure of the position of transducer member 41 relative to member 40.

The accumulated bits in the pulse-amplitude control 28 and in the pulse-width control 30 are each transmitted via lines 71 and 72, respectively, as inputs which control drive circuit 33. In response to the fine and the coarse bits, drive circuit 33 produces the desired output signals on output lines 37 and 38.

The pulse-width control 30 and the drive circuit 33 are timed by clock 21 via the clock output line 20. Similarly, the count control 35 and the pulse-amplitude control 28 in generator 4 are clocked by signals on lines 85 and 99 synchronously derived from clock 21.

Count Control (35)

Figure 2:
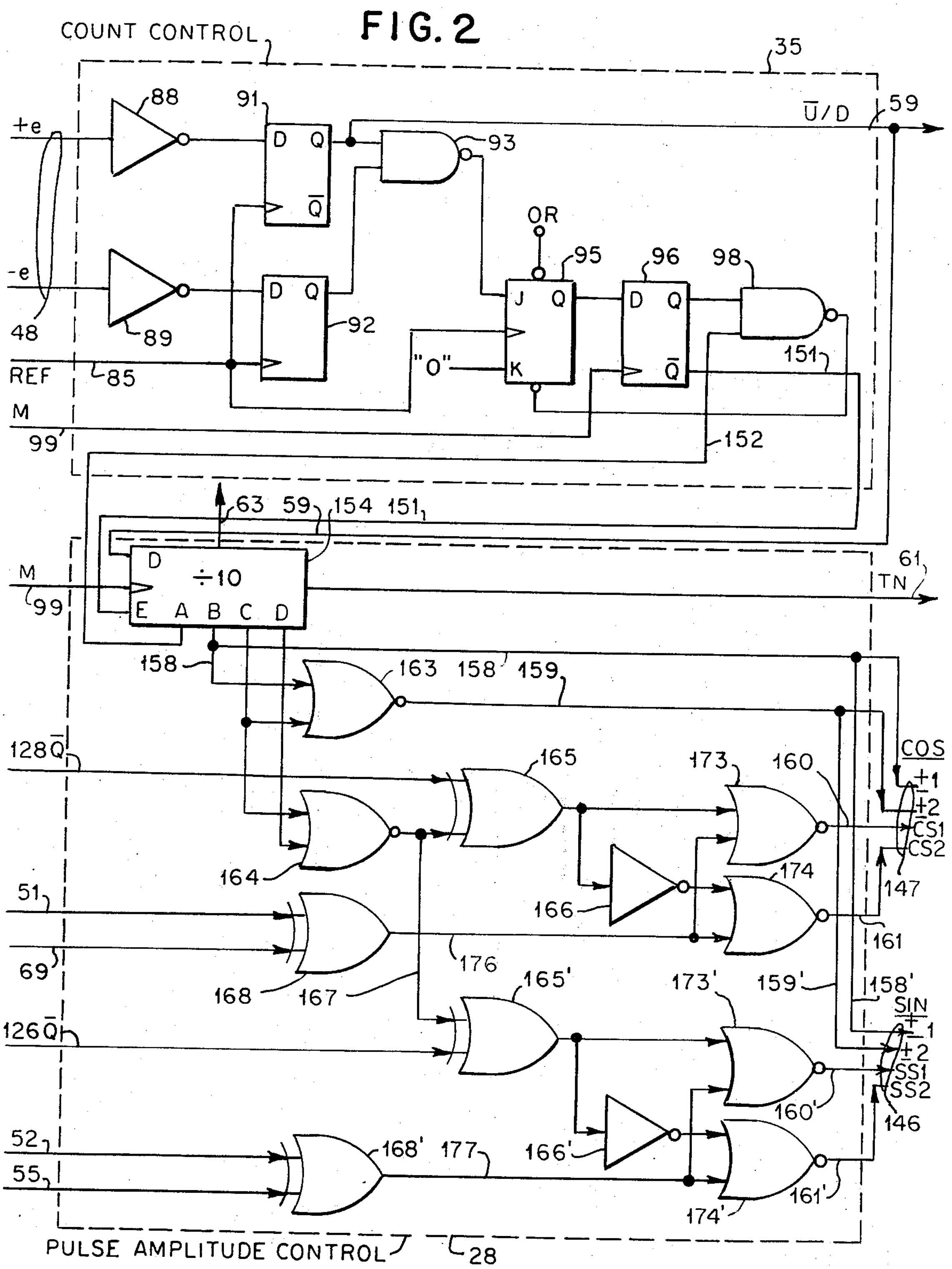
FIG. 2 depicts block diagrams of the count control and the pulse-amplitude control units of the FIG. 1 apparatus.

Referring to FIG. 2, the count control 35 of FIG. 1 receives the dc error signal on input lines 48 with the positive error signal, +*e*, going to inverter 88 and the negative signal, −*e*, going to inverter 89. Inverters 88 and 89 are connected to the D inputs of flip-flops 91 and 92, respectively. The flip-flops 91 and 92 are clocked by the reference signal on line 85 and function, therefore, to store a 0 in flip-flop 91 if the positive dc error signal exceeds a threshold level and simultaneously to store a 1 in flip-flop 92. If the polarity of the error signals on lines 48 are reversed, then flip-flop 91 stores a 1 and flip-flop 92 stores a 0. If the error signal on both the positive and negative inputs are within a threshold region, the flip-flops 91, 92 store a 1. Under this latter condition, the error signal on lines 48 is said to be within a "notch" or within the electronic dead band of the detection circuitry. The Q outputs from the flip-flops 91 and 92 serve as inputs to a NAND gate 93.

Whenever both flip-flops 91 and 92 store a 1 indicating that the error signal on lines 48 is between the thresholds, that is in the notch, NAND gate 93 produces a 0 output which is stored in flip-flop 95 when clocked by the reference line 85. Whenever either the positive or negative value of the lines 48 exceeds the threshold, the output from NAND gate 93 is a 1 which is stored in the flip-flop 95 at the clock signal produced on reference line 85. The 1 or 0 stored in flip-flop 95 from which it is transferred to flip-flop 96 by the next positive-going transition of the M line 99 from pulse-width control 30 which functions to clock the flip-flop 96. A transfer of a 1 to the flip-flop 96 causes the Q and Q outputs thereof to provide 1 and 0, respectively; a transfer of a 0 causes the Q and Q outputs to provide 0 and 1, respectively. The Q output of the flip-flop 96 is connected to a NAND gate 98 at one of two inputs thereof, the other input being connected to a divide-by-ten counter 154 at the output of an A stage thereof via a signal line 152. Pulse-amplitude control 28 is described in further detail hereinafter. Briefly, however, counter 154 of control 28 has an M line 99 input which steps counter 154 one count, either up or down, depending on the level of up/down line 59 and whenever line 151 is a 0 for enabling counter 154.

Whenever a 1 is transferred from flip-flop 95 to flip-flop 96 by a positive-going pulse on M line 99, the $\bar{Q}$ output of flip-flop 96 goes from 1 to 0 thereby enabling counter 154. The next pulse on line 99 steps counter 154 one count, thereby rendering the A output on line 152 a 1. In concurrent response to 1 on the line 152 and 1 provided by the Q output of flip-flop 96, the NAND gate 98 provides a 0 which forces flip-flop 95 to a 0 state. The next pulse on line 99 transfers the 0 from flip-flop 95 to flip-flop 96. However, that same pulse on line 99 is also counted in counter 154 since flip-flop 96 is still in a 1 state thereby rendering the counter 154 enabled. As soon as the 1 is transferred from flip-flop 95 to flip-flop 96, the $\bar{Q}$ output of flip-flop 96 is reset to a 1 thereby disabling counter 154. The effect of the above operation is to count two pulses into counter 154 each time flip-flop 95 is set to a 1 by NAND gate 93. Counter 154 has higher order stages B, C and D which receive the carry outs from the A stage. Since counter 154 has a count range of 10 and since it counts two counts on its input for each one stored in flip-flop 95, counter 153 is effectively a scale of 5 counter of the number of 1's stored in flip-flop 95 as considered on an algebraic basis with the sign determined by the up/down line 59 level. The output from counter 154 on TN line 61 is produced every time five bits have been accumulated by counter 154. The output on line 61 is, therefore, representative of one coarse bit. The coarse bit output on line 61 from the pulse-amplitude control 28 is applied as an input to the pulse-width control 30.

Pulse-Width Control (30)

Figures 3, 4:
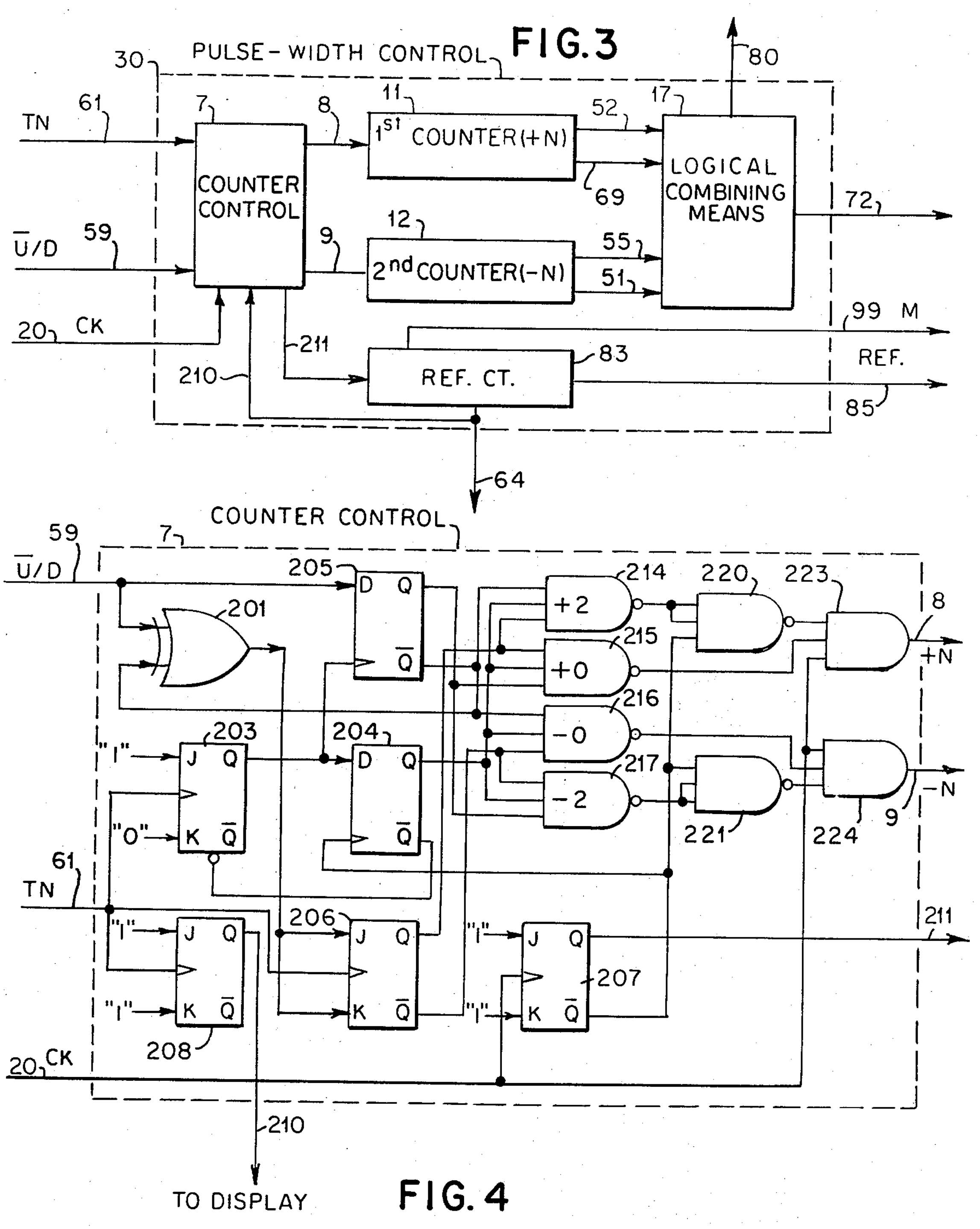
FIG. 3 depicts a block diagram of a pulse-width control portion of the FIG. 1 apparatus.
FIG. 4 depicts the counter control portion of the pulse-width control of FIG. 3.

The pulse-width control 30 of FIG. 1 is shown in further block diagram detail in FIG. 3. Each input pulse on TN line 61 represents, for the particular embodiment shown, a five bit change in the space position, X, of transducer 42. Line 61 is an input to counter control 7 which also receives an an input the U/D line 59 which defines the positive or negative sense of the pulses on line 61. Counter control 7 is shown in further detail in FIG. 4.

In FIG. 3, counter control 7 produces pulses on output lines 8 and 9 which are applied as inputs to first and second counters 11 and 12, respectively. In general, for an input pulse on line 61, first counter 11 or second counter 12, depending upon the level of the up/down line 59, receives more pulses than the other counter. In this manner, the first and second counters store and algebraically accumulate the number of pulses input on line 61. The outputs from first and second counters 11 and 12 on lines 52 and 69 and on lines 55 and 51, respectively, connect to the logical combining means 17. The output signals on lines 52 and 69 relative to the output signals on lines 55 and 51 have a phase shift which is proportional to the difference in count between first and second counters 11 and 12. By logically combining those phase-shifted signals, pulse-width modulated control signals are developed on output line 72 which control the operation of drive circuit 33 in FIG. 1 to produce pulse-width modulated signals on output lines 37 and 38.

In addition, the logical combining means 17 also produces on output lines 80 control signals for controlling the pulse-amplitude control 28 of FIG. 1.

Referring still to FIG. 3, the pulse-width control 30 additionally includes a reference counter 83 which is stepped by the clock pulses on line 20. In a preferred embodiment of the invention, the first and second counters 11 and 12 are changed in count symmetrically relative to the reference counter 83. Accordingly, the output from the reference counter 83 on line 85 is conveniently used as a phase detection signal shown as an input to the analog circuit 5 in FIG. 1.

Additionally, as shown in FIG. 1, at a time when the second counter 12 goes through zero, the reference counter 83 stores a count representing the coarse position of transducer member 41. Accordingly, output lines 64 are connected to display 26 so as to provide a parallel readout of the reference counter.

While the parallel readout technique of obtaining the desired representation of the position of transducer member 41 may be employed, alternate methods also may be employed. For further details of the manner in which the pulses on line 58 are accumulated in an additional external counter (not shown) in order to record the count suitable for display, reference may be had to the above-referenced U. S. Pat. No. 3,686,487.

Pulse-Width Control; Counter Control (7)

The counter control 7 within the pulse-width control 30 of FIG. 3 is shown in detail in FIG. 4. In FIG. 4, the TN line 61 which carries the coarse pulses, each equal to five fine bits, functions to generate an unequal number of output pulses on output lines 8 and 9 as a function of each input pulse. Up/down line 59 determines which of the lines 8 or 9 receives the greater number of pulses. Line 61, carrying the coarse pulses, is connected to the clock inputs of flip-flops 203, 206, 208. Flip-flop 203, having its *J* input connected to a 1 and its *K* input connected to a 0, functions to store each input pulse on line 61. Flip-flop 206 has its *J* and *K* inputs connected from the output of EXCLUSIVE-OR gate 201. Flip-flop 206, therefore, toggles for each input pulse on line 61 unless there has been a change in the signal level on the up/down line 59. Flip-flop 208 having both its *J* and *K* inputs connected to 1 toggles for each input pulse. The output from flip-flop 208 is connected to display 26 in FIG. 1 as one of the digits of data necessary for display of the position of member 41 of transducer 42.

Each pulse stored in flip-flop 203 is transferred to flip-flop 204 by the action of the clock signal on line 20 as divided by 2 in flip-flop 207. The $\overline{Q}$ output of flip-flop 207 is connected to the clock input of flip-flop 204 and transfers the stored value in flip-flop 203 from the Q output of flip-flop 203 to the D input of flip-flop 204. At the time that the 203 Q output level is transferred from the J input of flip-flop 203, a clock signal is simultaneously applied to flip-flop 205 which has its clock input connected to the Q output of flip-flop 203. Flip-flop 205 functions to store the level of the up/down line 59 at the time of transfer of the information of flip-flop 203 to flip-flop 204. Flip-flop 205 has its D input connected to the up/down line 59.

EXCLUSIVE-OR gate 201 has one input derived from the up/down line 59 and its other input derived from the Q bar out-put of flip-flop 205. The operation of the EXCLUSIVE-OR gate 201 is to compare the present state of the up/down line 59, at the time of a transfer of information from flip-flop 204, with the previous state of line 59 at the previous transfer of information from flip-flop 203 to flip-flop 204 as recorded in the level of Q bar output of flip-flop 205. If there has been no change in the up/down line 59 level, the output to the *J* and *K* inputs of flip-flop 206 will be a 1 thereby allowing flip-flop 206 to change states with each input pulse on line 61. Whenever there is a difference between the current up/down line 59 level and the previous level, the output from EXCLUSIVE-OR gate 201 is a 0 thereby inhibiting change of flip-flop 206. The output from the up/down flip-flop 205, the stored toggle pulse in flip-flop 204, and the parity flip-flop 206 are all decoded in the NAND gates 214, 215 and 216, 217, 220, 211 and AND gates 223 and 224.

The function of the counter control 7 of FIG. 4 is basically the same as that of the similar device described in the above-referenced application Ser. No. 112,994. While the apparatus of FIG. 4 in the present application is one preferred embodiment, the device in Ser. No. 112,994 can similarly be employed in order to carry out the present invention.

Pulse-Width Control; First and Second Counters (11,12) and Logical Combining Means (17)

Figures 5, 5B:
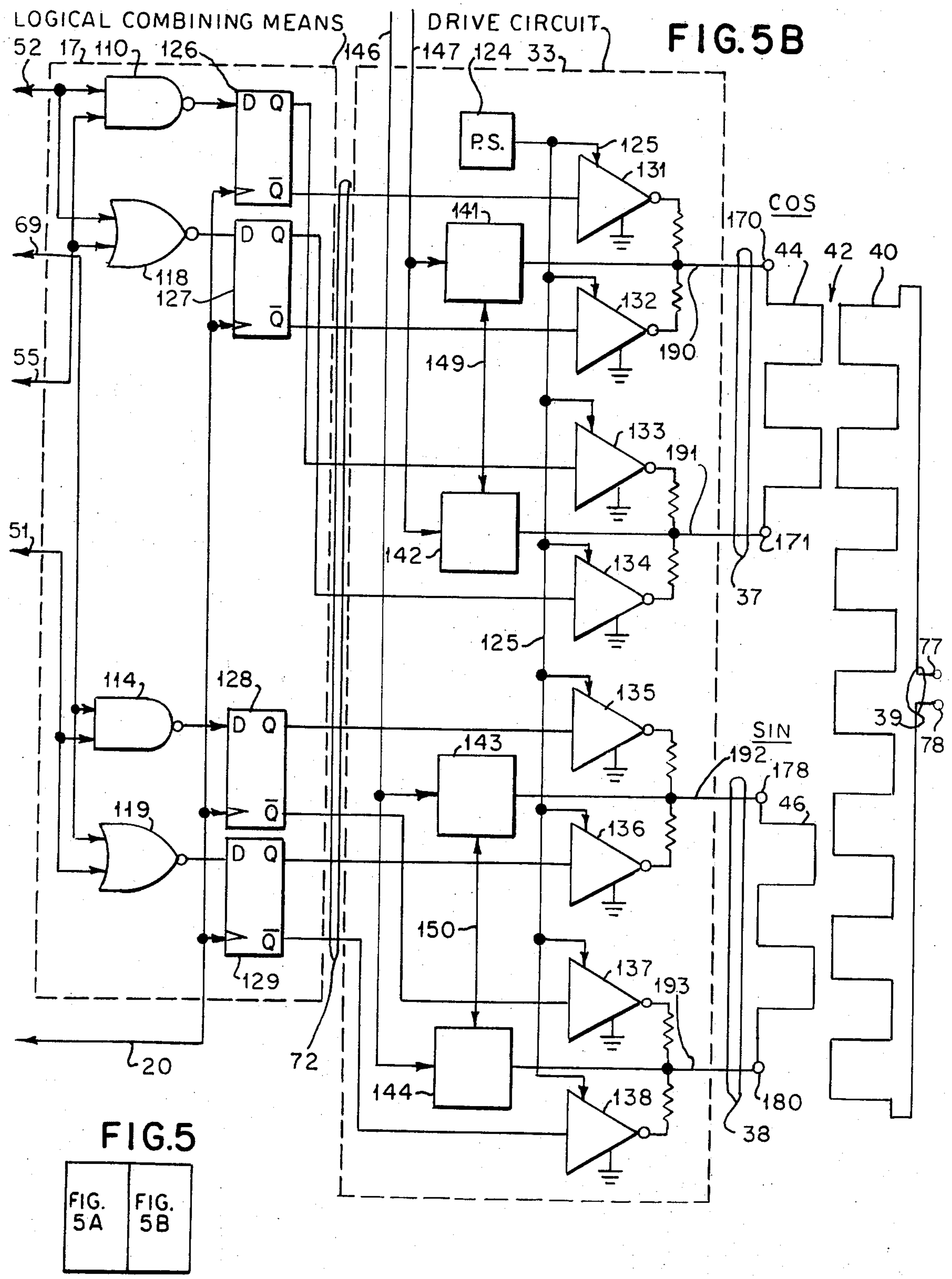
FIG. 5, 5A, 5B depict the counters and logical combining means portions of the pulse-width control of FIG. 3 in combination with the drive circuit and transducer of the FIG. 1 apparatus.
Figures 5A, 8A:
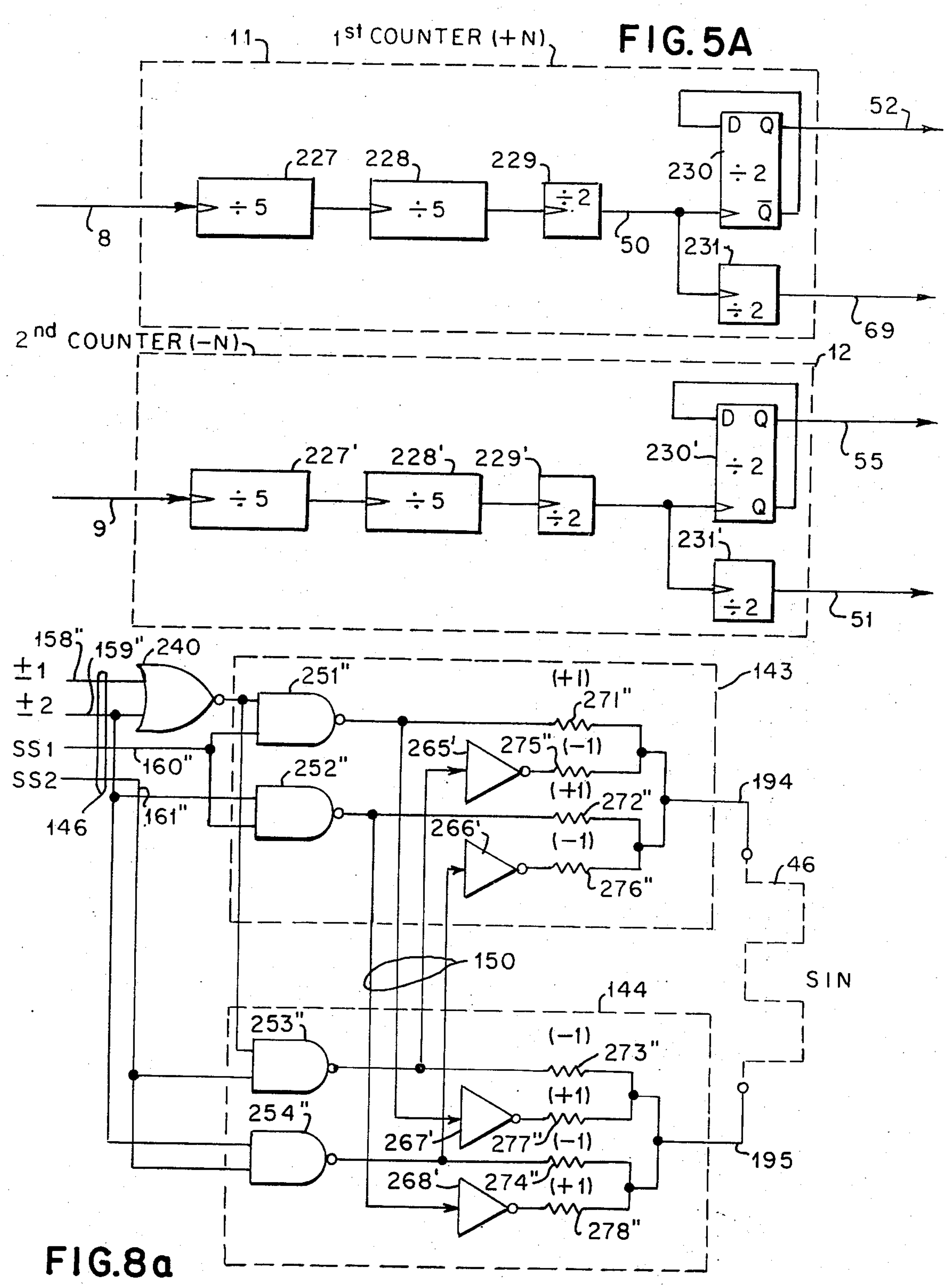
FIG. 8a depicts further details of the pulse-amplitude portions of the drive circuit of FIG. 5 as does FIG. 8, however the resistors are weighted at +1, −1 and +1, −1 wherein the resistors in FIG. 8 are weighted at +1, −1 and +2, −2.

Referring to FIG. 5, the first and second counters 11 and 12 receive the input stepping pulses on lines 8 and 9 produced by the outputs from the control counter 7 of FIG. 4.

The counter 11 includes the divide-by-five stages 227 and 228 followed by a divide-by-two stage 229 and two parallel divided-by-two flip-flops 230 and 231. The direct output of counter 11 appears on line 69 from divide-by-two flip-flop 231. The output of counter 11 on line 52 is derived from counter stage 230 and is 90 degrees phase-shifted with respect to the output on line 69.

Similar to counter 11, counter 12 includes corresponding divide-by-five stages 227′, 228′, feeding a divide-by-two stage 229′ and two parallel divide-by-two stages 230′ and 231′. The direct counter output on line 51 is derived from counter stage 231′. The output from counter 12 appears on line 55 and is 90° phase-shifted with respect to the output on line 51.

The outputs on lines 52 and 69 are phase-shifted relative to the outputs on lines 55 and 51 as a function of the difference in count stored by the first and second counters 11 and 12. Further details as to the nature of the output signals from counters 11 and 12 of the present application may be had by referring to the output signals from the like-numbered counters in the above-referenced U. S. Pat. No. 3,686,487.

Still referring to FIG. 5, the outputs from counters 11 and 12 serve as the inputs to the logical combining means 17. The logical combining means 17 of the present invention is analogous in function, although different in detail, to the logical combining means 17 in the above-referenced U. S. Pat. No. 3,686,487. Specifically, the Q output on line 52 from flip-flop 230 connects as an input to NAND gate 110 and NOR gate 118. Similarly, the Q output on line 55 of flip-flop 230′ connects as an input to NAND gate 110 and NOR gate 118. Analogously, the outputs on lines 69 and 51 from flip-flops 231 and 231′, respectively, each are connected as inputs to NAND gate 114 and NOR gate 119.

Flip-flops 126, 127, 128 and 129 receive inputs from the NAND gate 110, NOR gate 118, NAND gate 114 and NOR gate 119, respectively. The clock line 20 connected to the clock inputs of each of the flip-flops 126 through 129 functions to store the respective levels provided by the gates 110, 118, 114 and 119 on each leading edge of a clock pulse. The Q and $\overline{Q}$ output of each of the flip-flops 126 through 129 is connected as inputs to drive circuit 33 and specifically, as inputs to the pulse-width drivers 131 through 138, inclusive. The Q and $\overline{Q}$ outputs of flip-flops 126 through 129, collectively identified as lines 72, define the pulse-width modulation and therefore the coarse measurement of the electrical signals which are produced in the cosine winding 44 and the sine winding 46 of transducer 42 in conjunction with the operation of the drive circuit 33.

Drive Circuit (33)

Drive circuit 33 includes the pulse-amplitude drivers 141, 142, 143, and 144 which operate in combination with the pulse-width drive circuits 131 through 138, inclusive. Further, details of the pulse-amplitude drive circuits 141 through 144 are shown and described in connection with FIGS. 7 and 8. A typical one of the pulse-width drivers 131 through 138 is shown and described in connection with FIG. 13.

Still referring to FIG. 5, the pulse-amplitude drivers 141 and 142 are controlled via input signals on lines 147 derived from the pulse-amplitude control 28. Similarly, the pulse-amplitude drivers 143 and 144 are controlled by the input signals on lines 146 also derived from the pulse-amplitude control 28.

The pulse-amplitude driver 141 has its output connected to line 190 which connects to terminal 170 of the cosine winding 44. Similarly, pulse-width drivers 131 and 132 have their outputs connected to line 190 and to input terminal 170 of cosine winding 44. The signal on line 190, therefore, is a summation of the pulse-width signals produced by drivers 131 and 132 and the pulse-amplitude signals produced by driver 141.

In an analogous manner, output line 191 connecting to the other terminal 171 of cosine winding 44 includes the sum of the pulse-amplitude signals produced by driver 142 and the pulse-width signals produced by driver 133 and 134.

In a like manner, signals on output line 192 connecting to terminal 178 of sine winding 46 is a sum of the pulse-amplitude driver signals from driver 143 and pulse-width signals from drivers 135 and 136.

Finally, the output line 193 connecting to the other terminal 180 of sine winding 46 is a sum of the pulse-width signals from drivers 137 and 138 and the pulse-amplitude signals from driver 144.

Pulse-Amplitude Control (28)

Referring again to FIG. 2, the pulse-amplitude control 28 includes the divide-by-ten counter 154 which is operated so as to effectively divide by 5 the number of fine bits of data generated in combination with the count control 35 all as previously described. Depending upon the count in counter 154 between 0 and 4 as determined by the high order binary bits B, C and D, the pulse-amplitude control 28 produces control signals on output lines 147 and 146 which connect to the drive circuit 33. For the five arabic counts, 0, 1, 2, 3 and 4, the binary count of counter 154 higher order D, C, and B stages is shown in the following CHART I:

CHART I

| Arabic Count | Counter 154 D | C | B | Weight | line 158 (±1) | line 159 (±2) | line 167 Sign 0 = + 1 = − |
|---|---|---|---|---|---|---|---|
| 0 | 0 | 1 | 0 | 0 | 0 | 0 | 0 |
| 1 | 0 | 1 | 1 | +1 | 1 | 0 | 0 |
| 2 | 1 | 0 | 0 | +2 | 0 | 1 | 0 |
| 3 | 0 | 0 | 0 | −2 | 0 | 1 | 1 |
| 4 | 0 | 0 | 1 | −1 | 1 | 0 | 1 |

In CHART I the intended weight of the pulse-amplitude signal is indicated in the WEIGHT column. As can be noted from inspection of the DCB count in counter 154, the plus or minus 1 weight is determined by the direct output on line 158 of the B stage. The plus or minus 2 weight is determined by NOR gate 163 which has connected as its inputs the B and C stages of counter 154. NOR gate 163 produces a signal on output line 159 whenever the plus or minus 2 weight is desired. The sign of the weight to be attributed to the output from counter 154 is determined by NOR gate 164 which receives as inputs, D and C stages of counter 154.

Still referring to FIG. 2, the output from NOR gate 164, bearing the desired sign of the counter 154 output, is connected as an input to EXCLUSIVE-OR gate 165 and EXCLUSIVE-OR gate 165'. EXCLUSIVE-OR gate 165 functions to combine the signal from gate 164 representing the pulse-amplitude sign with the signal representing the pulse-width sign as determined by the input to EXCLUSIVE-OR gate 165 from the 128 $\overline{Q}$ output of flip-flop 128 in FIG. 5. Similarly, in FIG. 2, EXCLUSIVE-OR gate 165' combines the sign of the amplitude signal of the NOR gate 164 with the sign of the pulse-width signal as determined by the 126 $\overline{Q}$ input derived from flip-flop 126 in FIG. 5. The output from EXCLUSIVE-OR gate 165 is supplied to NOR gate 173 and, through inverter 166, to NOR gate 174. NOR gate 173 and 174 determine the positive, negative, or zero sense of the pulse-amplitude weight, if any, which is to be added to the cosine winding drive signal. Additionally, the input to NOR gates 173 and 174 on line 176 from EXCLUSIVE-OR gate 168 determines the duration of any pulse which is to be added as part of the drive signal to the cosine winding 44. EXCLUSIVE-OR gate 168 receives its inputs from the counter outputs 51 and 69 from FIG. 5.

In a similar manner, in FIG. 2, the NOR gates 173' and 174' determine the positive, negative, or zero sense of the pulse-amplitude factor to be added by establishing appropriate levels on output lines 160' and 161'. NOR gates 173' and 174' receive the sign information as inputs from EXCLUSIVE-OR gate 165', the input to NOR gate 174' being through inverter 166'. The duration of any positive or negative amplitude pulse is controlled by line 177 from EXCLUSIVE-OR gate 168' which is connected as inputs to NOR gates 173' and 174'. EXCLUSIVE-OR gate 168' receives its input from lines 52 and 55 derived from the counter outputs of FIG. 5.

Note that in connection with the cosine control signals of line 147 that the duration of those signals is determined by cross coupling, via lines 51 and 69, to the sine circuitry of FIG. 5. Similarly, the duration of the sine amplitude signal as controlled by lines 146 in FIG. 2 is determined by input lines 52 and 55 which are derived from the cosine control signals in FIG. 5.

Drive Circuit; Pulse-Amplitude Drive (141, 142, 143 and 144)

Figure 7:
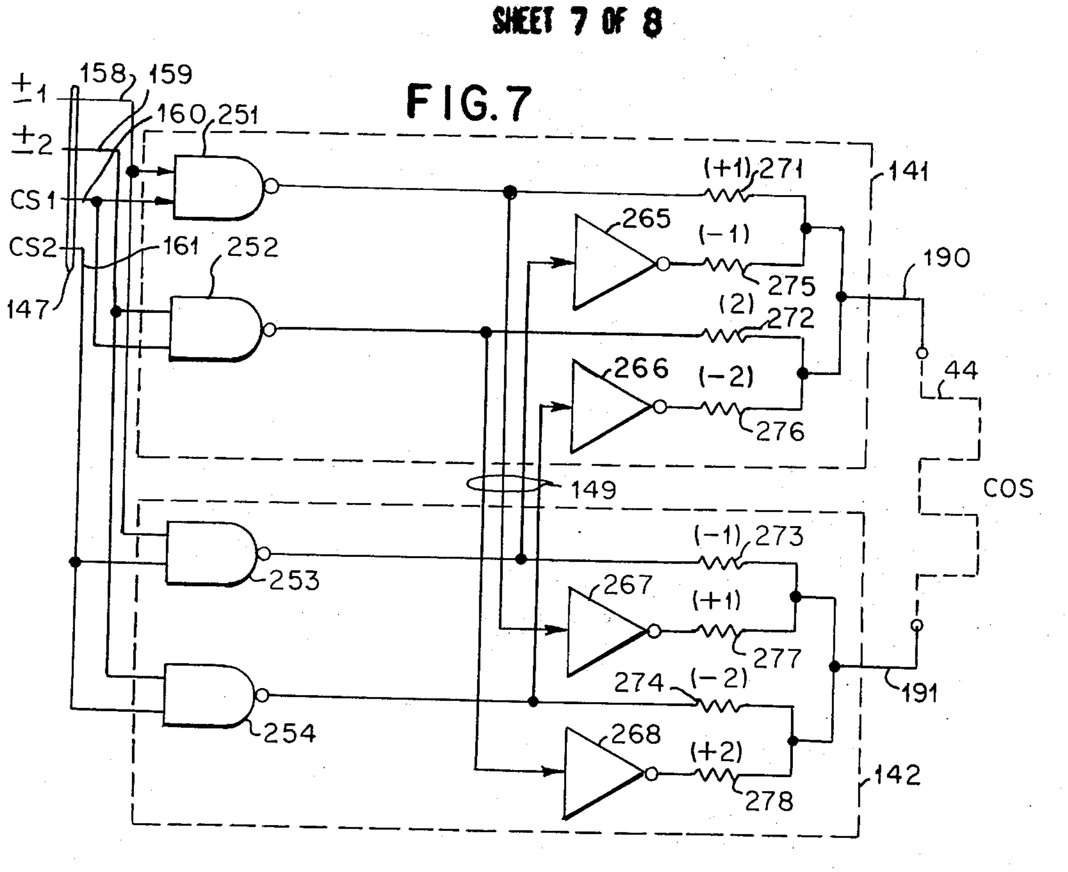
FIG. 7 depicts further details of the pulse-amplitude portions of the drive circuit of FIG. 5 which are connected to drive the cosine winding of a transducer.
Figure 8:
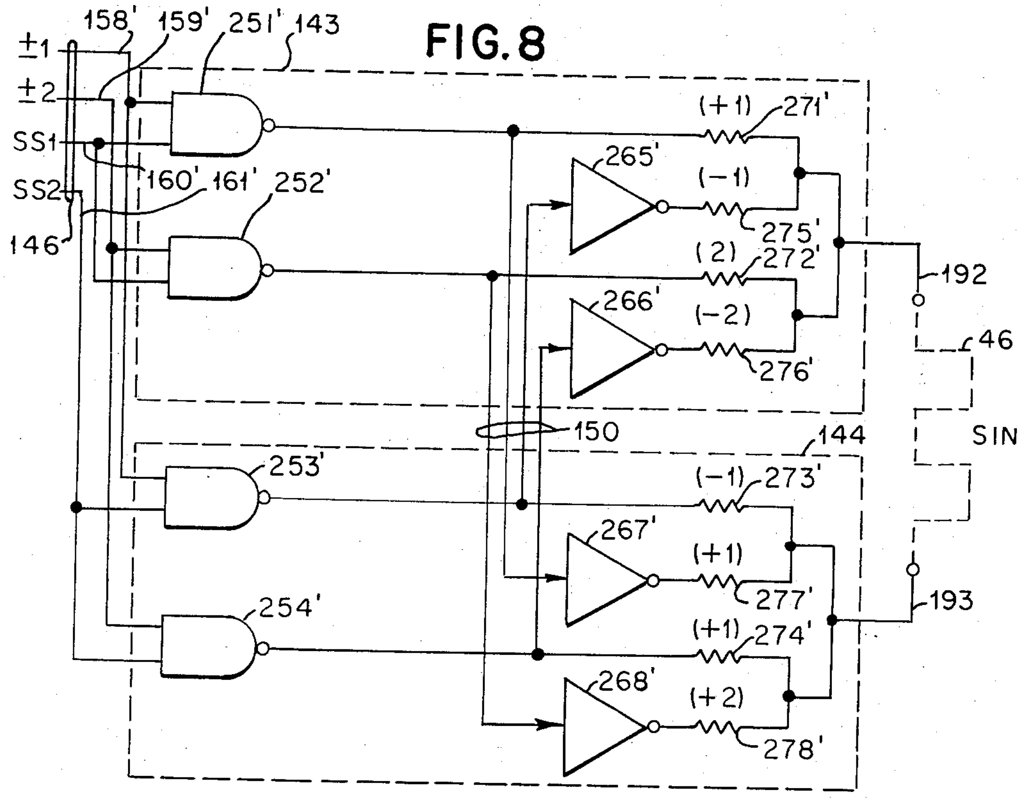
FIG. 8 depicts further details of the pulse-amplitude portions of the drive circuit of FIG. 5 which are connected to drive the sine winding of a transducer.

Referring to FIGS. 7, 8 and **8*a*, further details of the pulse-amplitude drives 141 through 144 of drive circuit 33 shown in FIG. 5 are depicted. In FIG. 7, the cosine control signals on lines 147 as derived from the pulse-amplitude control 28 of FIG. 2 determine the energization of output lines 190 and 191 to select both the amplitude and sign of the pulse-amplitude modulated signal to be added with any pulse-width modulated signal which drives the cosine winding 44. Specifically, the one bit line 158, signifying the addition of plus or minus 1 bit of pulse-amplitude fine data, is connected as an input to NAND gates 251 and 253. The two bit line 159 is connected as an input to the NAND gates 252 and 254. The first sign (plus or minus) line 160 is connected as the other inputs to NAND gates 251 and 252. The second sign (plus or minus) line 161 is connected as the other input to NAND gates 253 and 254**.

Alternatively, as shown in FIG. **8*a*, OR gate 240 may be added in on lines 158'' and 159'' and shown with like elements corresponding to those in FIG. 7 and FIG. 8 with a double prime added; where resistors 274'' and 278'' are connected together at output 195 and have a weight of 1 the same as resistors 273'' and 277'' which also have a weight of 1 and which are similarly connected at output line 195**.

Similarly, resistors 272″ and 276″ are selected to have a weight of 1 the same as the resistors 271″ and 275″.

The outputs from the NAND gates 251 through 254 connect to the summing resistors 271 through 274, respectively. Also, the outputs from the NAND gates 251 through 254 connect as inputs to the inverters 265 through 268, respectively, which in turn connect to the summing resistors 275 through 278, respectively. The summing resistors 271 and 275 are typically of equal value and are tied together in common to form output line 190.

Similarly, resistors 272 and 276 are selected to have a weight of 2 compared to the resistors 271 and 275. Resistors 272 and 276 are also connected in common to form output line 190 which serves as one input to cosine winding 44.

In a similar manner, resistors 273 and 277 are connected together at output line 191 and have a weight of 1 compared to the resistors 274 and 278 which have a weight of 2 and which are similarly connected together at output line 191.

Referring to FIG. 8, the pulse-amplitude drive circuits 143 and 144 are identical to the pulse-amplitude drive circuits 141 and 142, respectively, and like elements in FIG. 8 corresponding to elements in FIG. 7 have the same reference numeral with a prime added. The drive circuits 143 and 144 produce the outputs on lines 192 and 193 for driving the sine winding 46 in the same way that the FIG. 7 apparatus produces outputs on lines 190 and 191 for driving the cosine winding 44.

Drive Circuit, Pulse-Width (131)

Figure 13:
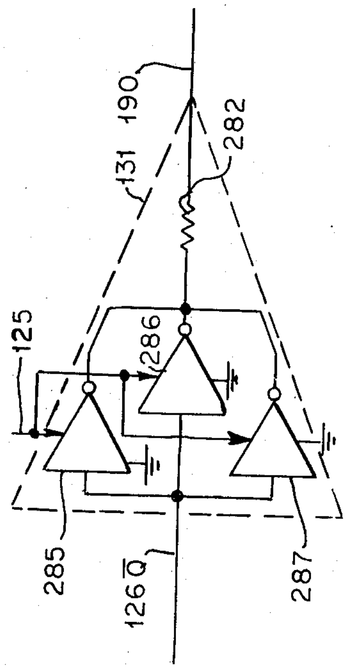
FIG. 13 depicts further details of a typical driver used in the pulse-width portion of the drive circuit of FIG. 5.

Referring to FIG. 13, a drive circuit 131, corresponding to drive circuit 131 in FIG. 5, is shown as typical for all of the drive circuits 131 through 138 of FIG. 5. In FIG. 13, the inverters 285, 286 and 287 drive power from power supply line 125 to establish an output signal through the summing resistor 282 which connects to output line 190. The high or low level of the signal is determined by the 126 $\bar{Q}$ input to the inverters 285, 286 and 287. Inverters 285 through 287 are typically Texas instruments Hex inverters H04.

OPERATION

Referring to FIG. 1, the apparatus having a combination of pulse-amplitude modulation and pulse-width modulation is shown. Briefly, transducer 42 has a variable input position member 41 which is moved to a space position X. The electrical signals from the generator 4 on lines 37 and 38 define an electrical position Y. The apparatus operates to render the electrical position Y equal to the space position X so as to reduce the error signal on line 39 to a null. Analog circuit 5 detects the level of the error signal on lines 39 and causes generator 4 via the DC error inputs on lines 48 to vary the electrical space position Y until the error signal is a null and thereby track the space position X. Display 26 functions to display the digital representation of the electrical position Y which is read out from generator 4 thereby forming a digital measure of the space position X of the member 41 of transducer 42.

Generator 4 operates on a digital basis whereby one digital bit represents the finest unit of measure for transducer 42. Generator 4 typically generates one pulse, representing one bit, for each change of one unit of measure of transducer 42. Each bit (hereinafter sometimes called fine bit) in generator 4 is represented in a weighted fashion by a combination of coarse bits (in the example shown, each equal to five fine bits) and fine bits.

The pulse-amplitude control 28, in one preferred embodiment, defines 5 fine bits of data for position measurement and the pulse-width control 30 defines 400 coarse bits of coarse data for position measurement. The combination of the fine bits of data and the coarse bits of data produces an apparatus which defines 2,000 (equal to 5 × 400) fine bits of data. Those 2,000 fine bits of data are operative to divide each space cycle of transducer 42 into 2,000 parts. The division, N, of the space cycle, therefore, equals 2000 and the space position X, for each cycle, has some value n which is one of 2,000 different discrete values. Similarly, the electrical signals on lines 37 and 38 which define the electrical position Y have 2,000 discrete values. In a preferred amplitude embodiment, those 2,000 values of Y are represented by 2,000 different amplitude ratios of the energy, at the fundamental frequency, in the signal on lines 37 relative to that in the signal on lines 38. Specifically, the signal on lines 37 has a fundamental frequency component with an amplitude proportional to cos $\theta$ and the signal on lines 38 has a fundamental frequency component with an amplitude proportional to sin $\theta$ where the electrical angle $\theta$ equals (n/N)360°.

The separate detailed operation of the count control 35, the pulse-amplitude control 28, the pulse-width control 30, and the drive circuit 33 components of generator 4 have been previously described. The combined operation of those components is now described in connection with the typical waveforms of FIG. 6 and of FIGS. 9 through 12.

Figure 6:
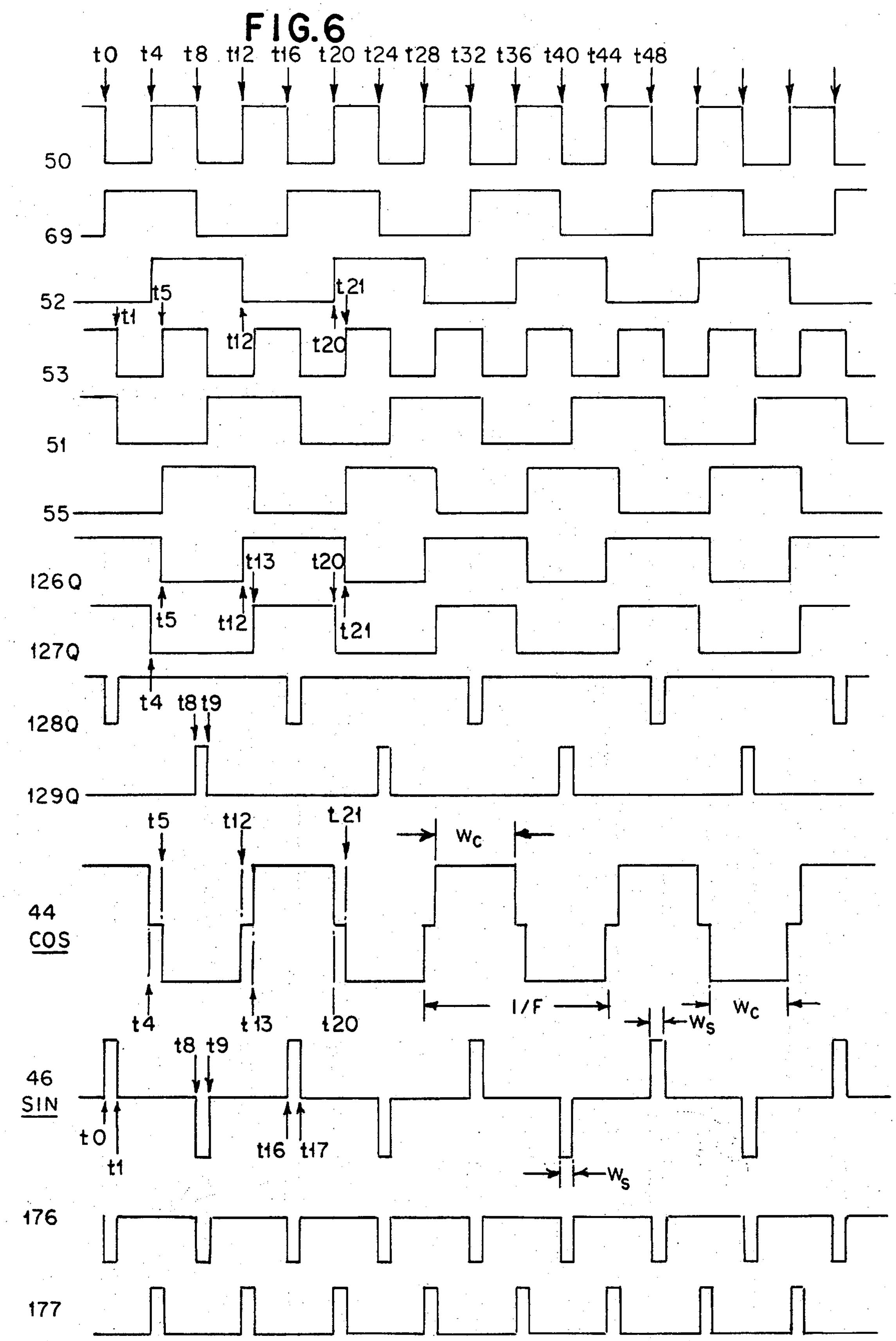
FIG. 6 depicts waveforms representative of the pulse-width modulation operation of portions of the FIG. 5 apparatus.

Referring to FIG. 6, typical waveforms are shown for a count, n, equal to 60 fine bits for a system where the total possible number of fine bits defined by the division, N, is 2000. For n equal to 60 and for N equal to 2,000, the electrical angle $\theta$, equal to (n/N)360°, equals (60/2000)360° or 10.8°. The pulse width, $W_c$, for the signal in cosine winding 44 and the pulse width, $W_s$, for the signal in sine winding 46 are given by the following expressions:

$$W_c = [N/2 - 2\ [((n+2) - (n+2)\mathrm{Mod}\ A)\mathrm{Mod}\ N]/\ N\ ][2\pi/F]$$

$$W_s = \pi - W_c$$

Figure 9:
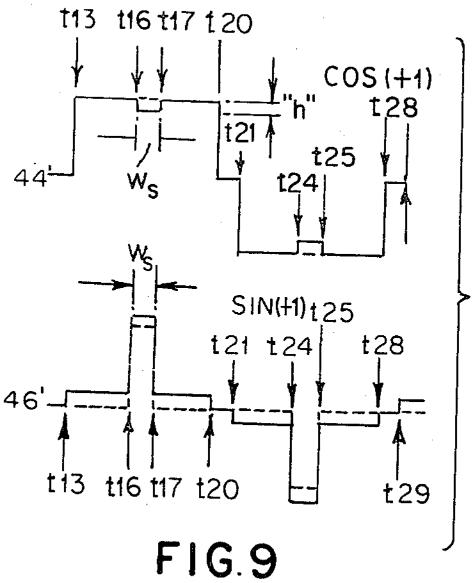
FIG. 9 depicts a waveform representative of a +1 amplitude bit combined with the pulse-width modulated waveforms shown in connection with FIG. 5.
Figure 10:
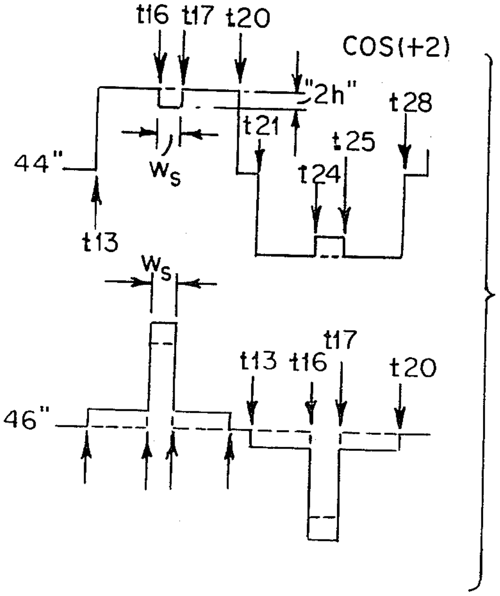
FIG. 10 depicts waveforms representative of the sine and cosine pulse-width modulated signals of FIG. 5 modified by a +2 bit amplitude modulation.

Where:

$W_c$ = pulse width of cosine signal (radians)
$W_s$ = pulse width of sine signal (radians)
n = accumulated count
$F$ = fundamental frequency
$A$ = number of amplitude bits
Mod = modular arithmetic operator For an apparatus with N equal to 2,000 and A equal to 5 and with a data input of n equal to 60 bits, $W_c$ equals (11/25) $(2\pi/F)$ and $W_s$ equals $\pi$ - (11/25) $(2\pi/F)$ where those values of $W_c$ and $W_s$ are the ones represented in FIG. 6 and also in FIGS. 9 and 10. FIGS. 9 through 12 depict waveforms which represent 61 bits, 62 bits, 63 bits, and 64 bits of data, respectively, where $\theta$ equals 10.98°, 11.16°, 11.34°, and 11.52°, respectively.

The manner in which the apparatus of the present invention counts is shown more specifically in the following CHART II. In CHART II, the weighted total number of bits of data is shown in the left-hand column. That weighted total is the sum of the pulse-amplitude fine bits plus the pulse-width coarse bits. The weighted total in CHART II starts at the sine zero count, which is arbitrarily defined as the zero of the apparatus of the present invention. From the sine zero weighted total of 0, counting proceeds to plus 1 and plus 2 fine bits to establish the plus 1 and plus 2 weighted total. Thereafter, one coarse bit has added to it minus 2 fine bits to yield a weighted total of 3. Similarly, the weighted total of 4 equals one coarse bit having a weight of 5 plus minus 1 fine bit to produce a weighted total of 4. The weighted total of 5 again returns the fine bits to zero condition and the cyclic nature of the pulse-amplitude and pulse-width summation continues over the full count range of 2,000.

In CHART II, the weighted totals from 60 through 65 are indicated. In FIG. 6, and in FIGS. 9 through 12, the representative waveforms for the weighted totals 60 through 64 are also shown.

CHART II

| Weighted Total | Pulse Amplitude Fine | Pulse-Width Coarse Fine Weight | Coarse Bits |
|---|---|---|---|
| 0 | 0 | 0 | 0 |
| 1 | +1 | 0 | 0 |
| 2 | +2 | 0 | 0 |
| 3 | −2 | 5 | 1 |
| 4 | −1 | 5 | 1 |
| 5 | 0 | 5 | 1 |
| 6 | +1 | 5 | 1 |
| 7 | +2 | 5 | 1 |
| 8 | −2 | 10 | 2 |
| 9 | −1 | 10 | 2 |
| 10 | 0 | 10 | 2 |
| 11 | +1 | 10 | 2 |
| 12 | +2 | 10 | 2 |
| 13 | −2 | 15 | 3 |
| 14 | −1 | 15 | 3 |
| . | . | . | . |
| . | . | . | . |
| . | . | . | . |
| 60 | 0 | 60 | 12 |
| 61 | +1 | 60 | 12 |
| 62 | +2 | 60 | 12 |
| 63 | −2 | 65 | 13 |
| 64 | −1 | 65 | 13 |
| 65 | 0 | 65 | 13 |

Pulse-Width Operation

For a total of 60 fine bits, the pulse-width control 30 accumulates and stores twelve coarse bits of data, and pulse-amplitude control 28 accumulates a balance of zero fine bits of data. The twelve bits of coarse data are stored in control 30 in the manner previously described in connection with FIG. 3.

Referring again to FIG. 3, first counter 11 and second counter 12 have cyclically stepped counts which are displaced relative to each other so as to define twelve coarse bits of data and produce phase-shifted output signals on lines 52 and 69 relative to the output signals on lines 55 and 51. Referring to FIG. 5, that relative phase shift between counters 11 and 12 exists between the signals on lines 50 and 53 within those counters. In FIG. 6, waveforms 50′ and 53′ correspond to the signals on lines 50 and 53 in FIG. 5. Waveform 50′, which has a negative going transition at *t*0, is phase shifted relative to waveform 53′, which has a negative going transition at *t*1. The divide-by-2 stage 231 produces a signal represented by the waveform 69′, and, similarly, the divide-by-2 stage 231′ produces the signal represented by waveform 51′. Comparing wave-forms 51′ and 69′ reveals a relative phase shift which, for the particular example chosen, represents twelve bits of coarse data and which is equal to 60 bits of fine data.

The divide-by-2 stage 230 produces, as shown by waveform 52′, a 90° phase-shifted waveform relative to waveform 69′. Similarly, the divide-by-2 stage 230′ produces, as shown by waveform 55′, 90° phase-shifted waveform relative to waveform 51′. Note that output stage 231 during an initial start-up mode is preset to the logical 1, whereas all the other stages in counters 11 and 12, and specifically stage 231′, are set to logical 0. In this manner, the output on line 69 is 180° shifted with respect to what it would be if stage 231 were preset during start-up to zero.

Still referring to FIG. 6, the waveform 126Q′ of flip-flop 126 has a negative going transition at *t*5 resulting from the positive going transition of waveform 53′. Thereafter, waveform 126Q′ has a positive going transition at *t*12 resulting from the negative going transition of waveform 52′. In a similar manner, each of the flip-flops 126 through 129 is switched as a result of the transitions indicated by the waveforms 52′, 69′, 55′, and 51′. The flip-flops 126 and 127 control the operation of the pulse-width drivers 131 through 134 of drive circuit 33 in FIG. 5, which are operative to energize the cosine winding 44 of transducer 42. Similarly, flip-flops 128 and 129 energize the drivers 135 through 138, which, in turn, energize the sine winding 56 of transducer 42.

Referring now to FIGS. 5 and 6, waveforms 44′ and 46′ in FIG. 6 depict the current through cosine winding 44 and sine winding 46, respectively. At time *t*0, the Q outputs of flip-flops 126 and 127 are both 1 so that the $\overline{Q}$ outputs are both 0. With the outputs in these states, the inverters 131 and 132, both have 0 inputs and therefore produce 1 outputs on line 190. Similarly, the inverters 133 and 134 have 1 inputs and therefore both produce 0 outputs on line 191. With both inverters 131 and 132 high, and inverters 133 and 134 low, current is conducted through cosine winding 44 from terminal 170 to terminal 171. At time *t*4, 127Q goes negative and 127Q goes positive. Therefore, just after *t*4, the input to inverter 132 is a 1 and the input to inverter 134 is 0. Therefore, just after *t*4, inverter 131 has a 1 output and inverter 132 has a 1 output. A current output from inverter 132 is conducted into inverter 131 rather than through the cosine winding 44. Similarly, just after t4, the output from inverter 133 is a 0, and the output from inverter 134 is a 1. Therefore, the current from inverter 134 is conducted into inverter 133 rather than through the cosine winding 44. Between the times *t*4 and *t*5, the 0 conduction condition of cosine winding 44 is indicated in waveform 44′ in FIG. 6. At time *t*5, the output from the Q terminal of flip-flop 126 in FIG. 5 switches from a 1 to a 0 so that just after *t*5, inverters 133 and 134 have 1 output, while inverters 131 and 132 have 0 outputs. Accordingly, current is conducted from inverters 133 and 134 via line 191 through cosine winding 44 to inverters 131 and 132. The current through cosine winding 44 under these conditions is, arbitrarily, for convenience, termed as negative. The negative current in cosine winding 44 exists for the duration from *t*5 to *t*12. At time *t*12, the 126Q′ waveform has a positive going transition which produces a 0 output from inverter 133 and a 1 output from inverter 131, while the 0 output of inverter 132 and the 1 output of inverter 134 is unchanged. Under these conditions, the current through cosine winding 44 is again zero from the duration from *t*12 to *t*13.

At time $t13$, the waveform 127′ has a positive going transition which causes the outputs from inverter 134 to be a 0 and the output from inverter 132 to be a 1. For the duration from $t12$ to $t20$, inverters 131 and 132 have 1 outputs, while inverters 133 and 134 have 0 outputs so as to cause a positive current through cosine winding 44 in the same manner as previously discussed for the period prior to $t0$ until $t4$.

In a manner similar to that discussed in connection with cosine winding 44, the sine winding 46 also has the inverters 135 through 138 selectively switched between the 1 and 0 states in order to cause a bilateral current to be conducted. Specifically, between $t0$ and $t1$, inverters 135 and 136 have 0 outputs, while inverters 137 and 138 have 1 outputs, thereby causing a negative current to be conducted through terminal 180 to terminal 178 of sine winding 46. For the duration from t1 to $t8$, inverters 135 and 138 have 0 outputs, while inverters 136 and 137 have 1 outputs, thereby producing the zero current condition in sine winding 46.

Between times $t8$ and $t9$, and output from the terminal Q of flip-flop 129 is a 1 so that the output from inverters 135 and 136 are 0's and the outputs from inverters 137 and 138 are 1's. Under this condition, a negative current is conducted through sine winding 46. From $t9$ until $t16$, the zero current condition again exists at $t16$, the flip-flops 128 and 129 are again in the same state as at $t0$, and the cycle repeats again.

Until this point, it has been assumed that the waveform 44′ and waveform 46′ currents through the sine and cosine windings receive no contribution from the pulse-amplitude modulated portion of the present invention. Under the condition where the pulse-amplitude modulation contributes nothing to the drive signals, the present invention works in a manner analogous to that previously described in the above-referenced application, Ser. No. 112,994. It is contemplated by the present invention that the adding in of the amplitude bits to the pulse-width modulated signals may be accomplished by the use of any suitable type of analog device such as fixed resistors, which are shown as 271–278 in FIGS. 7 and 8 but alternatively, as for example, a variable potentiometer or a resolver also may be utilized. However, the selection of this device should in no way limit the scope of the present invention.

If an additional coarse bit of data is generated by the pulse-amplitude control 28, by producing an output pulse on line 61 to the pulse-width control 30, the pulse-width control, as previously explained in connection with FIG. 3, produces a change by a phase shift of its output waveforms. Specifically, waveforms 50′ and 53′ are shifted relative to each other, thereby changing the relative "on" and "off" times of the waveforms 44′ and 46′. In the present invention, each coarse bit of data brackets four states of fine bit data, as if more fully explained in connection with FIGS. 9 through 12.

PULSE-AMPLITUDE AND PULSE-WIDTH OPERATION

The purpose for adding fine bit pulse-amplitude signals to the coarse pulse-width signals is to increase the total number of divisions of the transducer cycle without increasing the clock frequency or decreasing the carrier frequency. If the pulse-width pulses alone were modified in width to increase the total number of divisions, then either the clock frequency or the carrier frequency would necessarily be changed.

Referring to FIG. 5, the addition of the pulse-width signals and the pulse-amplitude signals occurs on the lines 190, 191, 192 and 193. Referring to line 190 as typical, line 190 receives the pulse-width signal from pulse-width drivers 131 and 132 and the pulse-amplitude signals from pulse-amplitude driver 141. A comparison of the pulse-width drivers, of which pulse-width driver 131 is shown as typical in FIG. 13, with the pulse-amplitude drivers, of which pulse-amplitude driver 141 in FIG. 7 may be considered as typical, reveals how the actual summation of the pulse-width and pulse-amplitude signals occurs. Specifically, the output resistance 282 from driver 131 connects to output line 190 as does the output resistors 271, 272, 275 and 276 from driver 141 of FIG. 7. The resistors 271 and 275 of FIG. 7 are chosen relative to the resistor 282 of FIG. 13 to produce a conductance equal to the desired ratio of pulse-amplitude current to pulse-width current. The ratios are selected so that each pulse-width step of one unit represents 5 bits of data while each pulse-amplitude step represents 1 bit of data. To obtain a proper ratio of conductances, it has been determined that a 320 Ohm resistor for resistor 282 in FIG. 13 is satisfactory while resistors 271 and 275 in FIG. 7 are 4,800 Ohms while resistors 272 and 276 (having a weighted value twice as great as resistors 271 and 275) have a value of 9,600 Ohms.

The fine bits of pulse-amplitude data are added to or subtracted from the pulse-width data in a manner previously described in connection with CHART II. In order to further describe the addition and subtraction now explained referring to FIGS. 9 through 12, referring to FIG. 9, a cosine waveform 44′ and a sine waveform 46′, during the period from $t13$ to $t29$ are shown in expanded form over a portion of the same time period for the corresponding waveforms in FIG. 6.

Additionally, in FIG. 9, a +1 amplitude bit is added to the corresponding waveforms in FIG. 6. The dotted waveforms in FIG. 9 represent the shape of the pulse-width waveform as if the amplitude bits had not been added in. Specifically referring to waveform 44′ in FIG. 9, one amplitude bit between periods t16 and $t17$ is shown subtracted from the pulse-width waveform which would otherwise be a constant positive value between $t13$ and $t20$. In a similar manner, one bit of amplitude data is subtracted from the negative going portion of waveform 44′ between $t21$ and $t28$, where the amplitude bit is subtracted between the time $t24$ to $t25$. The additions and subtractions of the amplitude and pulse-width waveforms occurs as a result of the summations on lines 190, 191, 192 and 193 of the signals from the pulse-width and pulse-amplitude drivers as shown in FIG. 5.

Still referring to FIG. 9, one bit of data is subtracted from the cosine waveform 44′, one bit of data is added to the sine winding waveform 46′. Specifically, the waveforms from $t13$ to $t20$ are everywhere one amplitude bit greater than for the pulse-width waveform alone, which is shown dotted. Similarly, between the period $t21$ and $t28$ is also one amplitude bit greater in negative value than the pulse-width waveform alone.

Referring now to FIG. 10, the cosine waveform 44″ and the sine waveform 46″ represent the pulse-width waveforms of FIG. 6 with the addition of 2 positive pulse-amplitude bits. In FIG. 10, the additions and subtractions of pulse-amplitude bits occur at the same time periods indicated in FIG. 9, but in FIG. 10 they have twice the amplitude as in FIG. 9. By twice the amplitude it is meant, for example, that the height $h$, of the subtraction in waveform 44' is one-half that of the height, $2h$, of the subtraction in waveform 44''.

Figure 11:
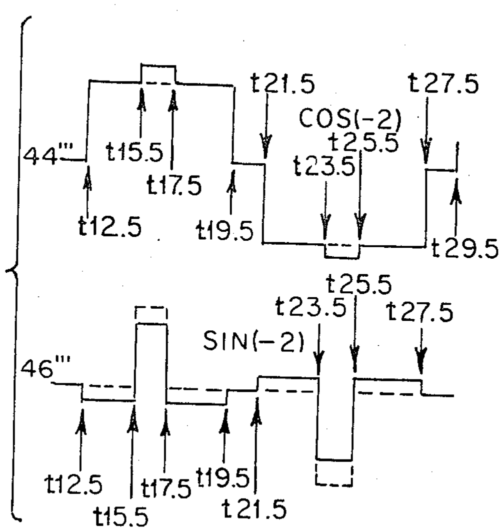
FIG. 11 represents sine and cosine waveforms which have a 1 bit greater pulse-width modulation than the sine and cosine waveforms of FIG. 5 further modified by a −2 bit pulse-amplitude modulation.

Referring now to FIG. 11, a −2 bit amplitude is added to modified versions of the pulse-width waveforms of FIG. 6, where those pulse-width waveforms of FIG. 6 are modified by an increase of one coarse bit. Therefore, the pulse-width waveform of FIG. 9 represents 12 coarse bits (equal to 60 fine bits) plus one fine bit for a total weighted value of 61 fine bits of data. FIG. 10 represents 12 coarse bits of data plus 2 fine bits of data for a total weighted value of 62 fine bits of data. FIG. 11 represents 13 coarse bits (equal to 65 fine bits) of data plus −2 bits of fine data for a total weighted value of 63 fine bits of data. Finally, FIG. 12 represents 13 bits of coarse data plus −1 bit of fine data for total weighted value of 64 fine bits of data.

Referring again to FIG. 11, the pulse-width of the cosine waveform 44''' extends from $t12.5$ to $t19.5$ with a pulse-amplitude addition between $t15.5$ and $t17.5$ during the positive half cycle. Similarly, during the negative half cycle, the pulse-width extends between $t21.5$ and $t27.5$ with a 2 bit amplitude addition between $t23.5$ and $t25.5$.

In a similar manner, the sine waveform 46''' includes a subtraction of 2 amplitude bits for the duration from $t12.5$ to $t19.5$ with the basic pulse-width existing between $t15.5$ and $t17.5$ during the positive half cycle. In a similar manner, during the negative half cycle, 2 amplitude bits are subtracted between $t21.5$ to $t27.5$ where the negative going pulse-width extends between $t23.5$ and $t25.5$.

Figure 12:
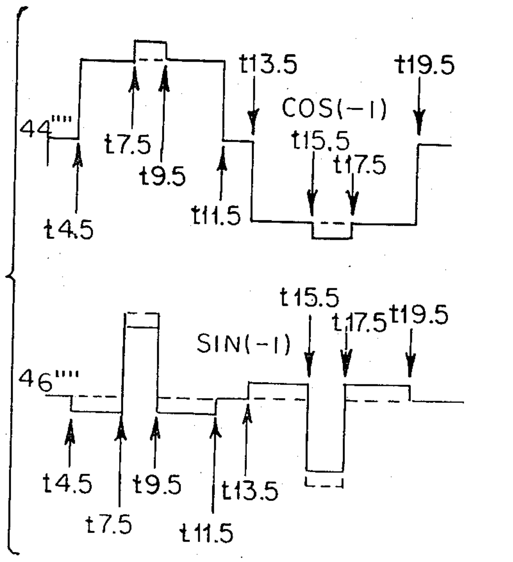
FIG. 12 represents sine and cosine waveforms having a pulse-width modulation like that of FIG. 11 but modified by a −1 bit pulse-amplitude modulation.

Referring now to FIG. 12, the pulse-width waveform of FIG. 11 is shown in combination with a −1 addition of amplitude data. The duration of the additions and subtractions of amplitude data in FIG. 12 are the same as in FIG. 11, except that the amplitude weight is half as much in FIG. 12 as in FIG. 11.

The addition of an additional fine bit of data to the waveform of FIG. 12 is carried out by completely eliminating any amplitude contribution so that the waveform would then appear as indicated by the dotted portion in FIG. 12. The addition (not shown) of a second fine bit of data to the wave-forms of FIG. 12 is carried out by adding a +1 amplitude value to the waveforms of FIG. 12 in the same way that the +1 bit of data is shown added to the data of the waveforms of FIG. 9.

A still third bit of data is added (not shown) to the FIG. 12 waveforms in the same manner as +2 bits of data are shown added to the FIG. 10 waveforms. The fourth bit of data is added to the FIG. 12 waveforms by changing (not shown) the basic pulse-widths of that waveform and subtracting −2 bits of data. The process of adding and subtracting amplitude bits from the basic pulse-width bits continues in the manner indicated for any total change desired.

While the invention has been particularly shown and described with reference to preferred embodiments thereof, it will be understood by those skilled in the art, that the foregoing and other changes in form and details may be made therein without departing from the spirit and scope of the invention.

What is claimed is:

1. In the method of providing an output pulse train having a frequency component with an amplitude and a phase representative of a trigonometric function of an angle, the steps of:

apportioning said angle into a fine portion and a coarse portion;

generating a first train of pulses at a carrier frequency wherein each pulse has a duration which is a first function of said coarse portion;

generating a second train of pulses at said carrier frequency wherein each pulse has a duration which is a second function of said coarse portion and has an amplitude which is a function of said fine portion; and algebraically combining said first and second pulse trains, thereby providing said output pulse train at said carrier frequency.

2. The method of claim 1 for providing a sine output pulse train having a carrier frequency component which has an amplitude proportional to the sine of said angle and has a phase representative of the sign of the sine of said angle, wherein:

the step of generating said first pulse train includes generating a carrier frequency component thereof having an amplitude proportional to the sine of said coarse portion and having a phase representative of the sign of the sine of said coarse portion;

the step of generating said second pulse train includes generating a carrier frequency component thereof having an amplitude proportional to a cosine product which is the product of a function of said fine portion and the cosine of said coarse portion and having a phase representative of the sign of said cosine product; and said combining step is a summation thereby providing said sine output pulse train.

3. The method of claim 2 wherein the step of generating said second pulse train includes generating pulses having an amplitude proportional to the tangent of said fine portion.

4. The method of claim 2 wherein the step of apportioning includes apportioning said angle to substantially cause an equality between said fine portion and the tangent thereof, and the step of generating said second pulse train includes generating pulses having an amplitude proportional to said fine portion.

5. The method of claim 1 for providing a cosine output pulse train having a carrier frequency component which has an amplitude proportional to the cosine of said angle and has a phase representative of the sign of the cosine of said angle wherein:

the step of generating said first pulse train includes generating a carrier frequency component thereof having an amplitude proportional to the cosine of said coarse portion and having a phase representative of the sign of the cosine of said coarse portion;

the step of generating said second pulse train includes generating a carrier frequency component thereof having an amplitude proportional to a sine product which is the product of a function of said fine portion and the sine of said coarse portion and having a phase representative of the sign of said sine product; and said combining step is a subtraction, thereby providing said cosine output pulse train.

6. The method of claim 5 wherein the step of generating said second pulse train includes generating pulses having an amplitude proportional to the tangent of said fine portion.

7. The method of claim 5 wherein the step of apportioning includes apportioning said angle to substantially cause an equality between said fine portion and the tangent thereof, and the step of generating said second pulse train includes generating pulses having an amplitude proportional to said fine portion.

8. In a digital-to-analog converter which receives signals representative of a change of an angle, a pulse-amplitude control and a pulse-width control provide respective signal representations of a fine portion and a coarse portion of said angle, a clock pulse source provides clock pulses to pulse-width modulator which is connected to said pulse-width control, said modulator provides a first train of pulses at a carrier frequency, each pulse thereof having a duration which is a first function of said coarse portion; the improvement comprising:

generating means connected to said controls and said clock source for generating a second train of pulses at said carrier frequency, each pulse thereof having a duration which is a second function of said coarse portion and having an amplitude which is proportional to said fine portion; and means connected to said pulse-width modulator and said generating means for providing an algebraic combination of the amplitudes of respective pulses of said first and second pulse trains, a carrier frequency component of said algebraic combination having an amplitude proportional to a trigonometric function of said angle and having a phase representative of the sign of said function.

9. Apparatus according to claim 8 wherein said algebraic combination includes a carrier frequency component having an amplitude proportional to the sine of said angle and having a phase representative of the sign of the sine of said angle, and said first pulse train includes a carrier frequency component having an amplitude proportional to the sine of said coarse portion and having a phase representative of the sign of the sine of said coarse portion, said generating means comprising:

means for generating said second pulse train with a carrier frequency component having an amplitude which is proportional to a cosine product which is the product of said fine portion and the cosine of said coarse portion and having a phase representative of the sign of said cosine product.

10. Apparatus according to claim 8 wherein said algebraic combination includes a carrier frequency component having an amplitude proportional to the cosine of said angle and having a phase representative of the sign of the cosine of said angle, and said first pulse train includes a carrier frequency component having an amplitude proportional to the cosine of said coarse portion and having a phase representative of the sign of the cosine of said coarse portion, said generating means comprising:

means for generating said second pulse train with a carrier frequency component having an amplitude which is proportional to a sine product which is the product of said fine portion and the sine of said coarse portion and having a phase representative of the sign of said sine product.

* * * * *